United States Patent [19]

Cooper

[11] Patent Number: 4,836,485
[45] Date of Patent: Jun. 6, 1989

[54] UNIVERSALLY ADJUSTABLE MOUNTING DEVICE

[75] Inventor: Gershon Cooper, Encino, Calif.

[73] Assignee: Alliance Research Corporation, Chatsworth, Calif.

[21] Appl. No.: 168,582

[22] Filed: Mar. 3, 1988

Related U.S. Application Data

[63] Continuation of Ser. No. 8,736, Jan. 30, 1987, abandoned.

[51] Int. Cl.⁴ .............................................. A47F 5/08
[52] U.S. Cl. ................................... 248/278; 248/558;
403/157; 403/79; 403/306
[58] Field of Search ...................... 248/278, 283, 289.1,
248/291, 282, 284, 354.5, 558, 159, 324, 333,
104, 160, 279, 287, 286; 403/157, 158, 79, 78,
305, 306, 287; 108/44, 45, 4

[56] References Cited

U.S. PATENT DOCUMENTS

| | | | |
|---|---|---|---|
| 604,008 | 5/1898 | Hughes | 248/284 X |
| 1,430,016 | 9/1922 | Kultunski | 248/278 X |
| 1,701,696 | 2/1929 | Parsons | 248/284 X |
| 2,270,948 | 1/1942 | Howe | 108/45 |
| 2,799,967 | 7/1957 | Molinari | 108/45 |
| 2,862,328 | 12/1958 | Wadsworth | 108/45 |
| 2,939,585 | 6/1960 | Burgin | 248/278 X |
| 3,362,671 | 1/1968 | Johnson | 248/324 |
| 4,314,771 | 2/1982 | Lambert | 403/306 X |
| 4,548,327 | 10/1985 | Kilkelly | 248/250 X |

FOREIGN PATENT DOCUMENTS 20307 of 1903 United Kingdom ................ 248/278

Primary Examiner—Ramon S. Britts
Assistant Examiner—Karen J. Chotkowski
Attorney, Agent, or Firm—Marvin H. Kleinberg; Matthew F. Jodziewicz

[57] ABSTRACT

A universally adjustable mounting device including a first mounting plate. Means for releasably connecting the first mounting plate to the first joint member in a selectively positionable and adjustable manner are provided. Manually adjustable locking means for retaining the first mounting plate and the first joint member in a selected position are included to resist any loosening of the selected position due to vibrational type or any other type of stressing forces that the device may undergo while in service in a moving vehicle. A second joint member and means for releasably connecting the first joint member and the second joint member, in an axially and rotationally adjustable manner, are provided to permit the device to be adjusted to accommodate various shaped and sized areas in the vehicle in which the device is to be installed. A second mounting plate and means for releasably connecting the second mounting plate to the second joint member in a selectively positionable and adjustable manner are provided to enable the device to be secured to various shaped surfaces, such as flat, curved or angled. Manually adjustable locking means are provided for retaining the second mounting plate and the second joint member in a selected position.

8 Claims, 1 Drawing Sheet

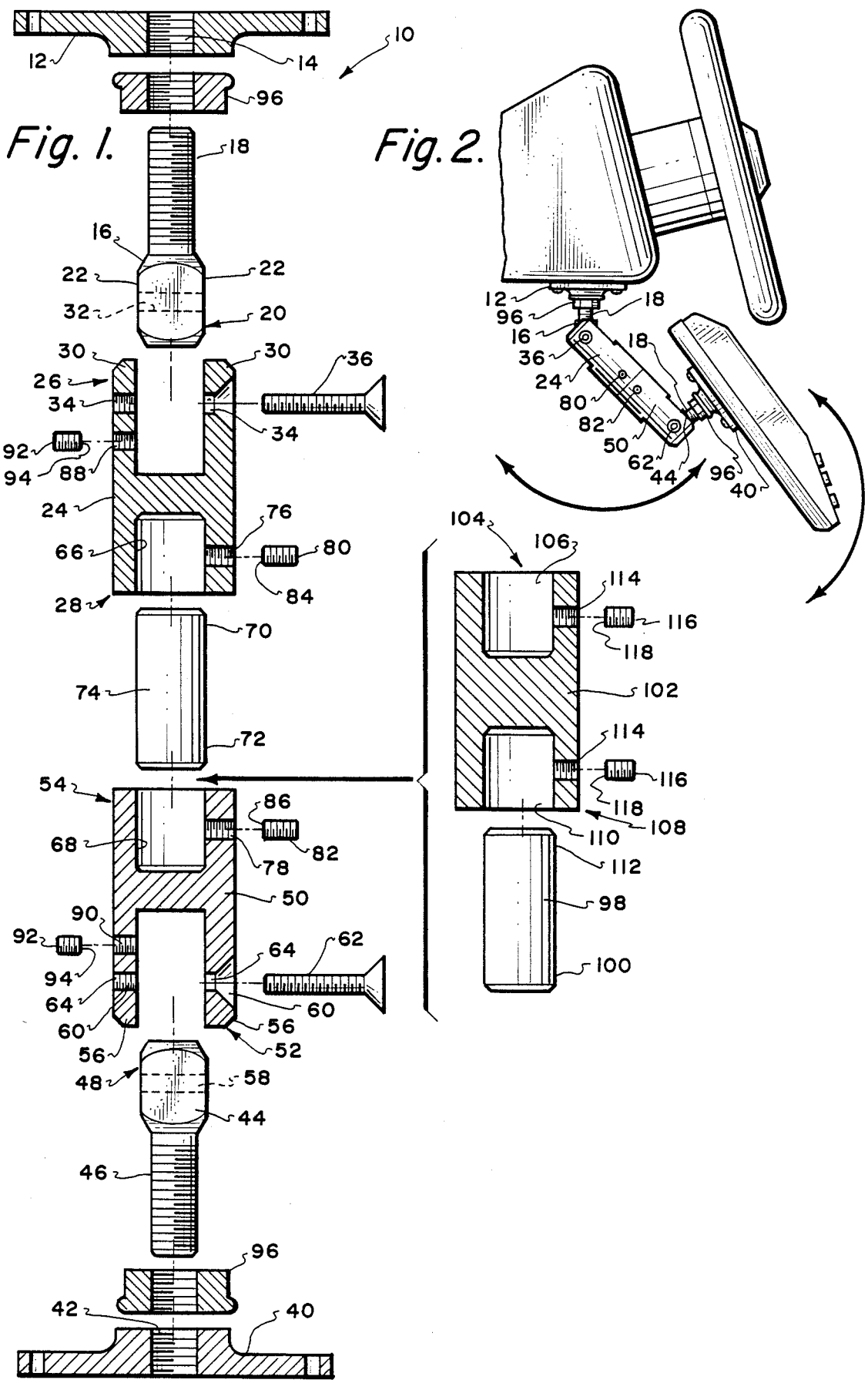

UNIVERSALLY ADJUSTABLE MOUNTING DEVICE

This is a continuation of co-pending application Ser. No. 071008,736 filed on 01/30/87, now abandoned.

BACKGROUND OF THE INVENTION

1. Field of the Invention

This invention relates in general to universally adjustable mounting devices, and, more particularly, to a universally adjustable mounting device having a locking means resistant to vibrational loosening.

2. Description of the Related Art

The current proliferation of accessories being added in the automotive aftermarket requires specially designed mounting devices and assemblies that can accommodate the limited available space normally found in a vehicle for mounting add-on equipment. These mounting devices must be able to handle the stress and shock forces encountered in a moving environment while still permitting the mounting device to be easily and quickly universally adjustable to provide the installer with maximum flexibility. It is necessary to accommodate the various shaped accessories being installed, and the limited, generally odd-shaped space available in which to mount the accessory.

The mounting device must also include a locking means that, when used, will provide a stable platform for the accessory that resists undesired movement due to vibrational or shock-induced forces caused by the vehicle's movement and the like. However, the device must be capable of rapid and easy adjustment when so desired by the user.

The two main basic mounting device structures currently in use are: the clamshell, a hinged plate that generally attaches to the side of the vehicle's console or similar flat mounting surface; and, the swivel post mount, employing a ball-and-socket arrangement.

The clamshell is a limited use mounting device that requires a rather specific space in which it can be mounted. Once the clamshell is mounted, it is restricted from further movement, and provides a generally permanent mounting having a fixed orientation for the planned user of the mounted accessory. Consequently, a user, not oriented as originally planned for by the installer of the clamshell, is disadvantaged in using the mounted accessory.

Due to its more universal adjustability and ease in mounting, the swivel post mount is in great demand. It consists of a post, mounted on the floor, or transmission hump, on the side of the console, or on the dash. The opposite end of the post generally includes a mounting plate attached to the post end by a ball-and-socket arrangement to permit the mounting device to be universally adjusted to suit both the demands of the space where the mounting device is sought to be mounted and the user's individual desires.

Finally, any such mounting device must accommodate various mounting surfaces, flat, curved, or angled to name only a few, without causing unnecessary damage to the mounting surface in case the user decides to remove the mounting device at a later date.

Many currently known mounting devices of both the clamshell and swivel post variety, rely on frictionally compressive locking means to hold the mounted accessory in place. These devices are generally prone to slippage caused by vibrational or shock-induced forces acting on the mounting device and the weight of the accessory itself. These prior art devices generally result in eventual slippage and failure of the locking means of the device due to the fact that the locking means usually comprises a single shaft that provides both an axis of movement for the mounted accessory and a means to hold the movement joint in a compressive, frictional relation. With this mechanical arrangement, all of the vibrational and shock-induced forces are directly transmitted to this single shaft which, as time passes, is loosened causing the mounted accessory to shift from its originally selected, and locked, position.

The present invention provides additional locking means that are radially off-centered from that of the primary shaft of the prior art devices. Being off-centered from the primary shaft of the movement joint, the additional locking means of the present invention resists any such vibrational or shock-induced loosening of the mounting device and, therefore, provides a superior mounting platform that is stable and yet capable of simple and easy adjustment when so desired by the user.

SUMMARY OF THE INVENTION

It is an object of the present invention to provide a universally adjustable mounting device that enables an installer to mount an accessory at any angle or position in a vehicle.

It is yet another object of the present invention to provide a universally adjustable mounting device that is resistive to vibrational loosening of the mounting device.

In summary, the present invention includes a universally adjustable mounting device comprising a first mounting plate. Means for releasably connecting the first mounting plate to the first joint member in a selectively positionable and adjustable manner are provided. Manually adjustable locking means for retaining the first mounting plate and the first joint member in a selected position are included to resist any loosening of the selected position due to shock and vibrational forces or any other type of stressing forces that the device may undergo while in service in a moving vehicle. A second joint member and means for releasably connecting the first joint member and the second joint member, in an axially and rotationally adjustable manner, are provided to permit the device to be adjusted to accommodate various shaped and sized areas in the vehicle in which the device is to be installed.

A second mounting plate and means for releasably connecting the second mounting plate to the second joint member in a selectively positionable and adjustable manner are provided to enable the device to be secured to various shaped surfaces, such as flat, curved or angled. Manually adjustable locking means are provided for retaining the second mounting plate and the second joint member in a selected position.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

BRIEF DESCRIPTION OF THE DRAWINGS

FIG. 1 is a partly cross sectional exploded view of a universal mounting device constructed in accordance with the present invention; and FIG. 2 is a side elevational view of a universal mounting device constructed in accordance with the present invention in use.

DESCRIPTION OF THE PREFERRED EMBODIMENTS

With reference being made to the drawings, especially FIG. 1, a universally adjustable mounting device 10 constructed in accordance with the present invention includes a first mounting plate 12 having a threaded hole or opening 14 therethrough.

A first bolt or shaft 16 has a threaded shank 18 adapted to be threadably received in the threaded opening 14 in the first mounting plate 12. First shaft 16 also has an opposite enlarged head end 20 with flattened sides 22 for a purpose described in detail below.

A first joint member 24 has a fork shaped end 26 and an opposite base end 28. The fork shaped end 26 is adapted to receive the enlarged head end 20 of the first bolt or shaft 16 between the tines 30 forming the fork shaped end 26.

Means are provided for releasably connecting, in a selectively positionable and adjustable manner, the fork shaped end 26 of the first joint member 24 to the enlarged head end 20 of the first shaft or bolt 16.

The preferred means to accomplish this comprises the enlarged head end 20 of the first shaft 16 and the fork shaped end 26 of the first joint member 24 each having an opening or passageway 32 and 34, respectively, aligned to receive a threaded bolt 36 therethrough. A portion 38 of the passageway 34 in the fork shaped end 26 of the first joint member 24 is threaded to mate with the threaded bolt 36 to retain the enlarged head end 20 of the first shaft 16 and the fork shaped end 26 of the first joint member 24 in a releasable, selectively positionable, compressive relationship. As the threaded bolt 36 is advanced into the threaded portion 38 of the passageway 34 in the fork shaped end 26 of the first joint member 24, the enlarged head 20 seats against the unthreaded tine 30. Since any further advance is prevented, further tightening draws the threaded portion 38 closer, compressively holding the first shaft 16.

A second mounting plate 40, similar to the first mounting plate 12, has a threaded hole or opening 42 therethrough. A second bolt or shaft 44 has a threaded shank 46 adapted to be threadably received in the opening 42 in the second mounting plate 40. Second shaft or bolt 44 also has an opposite enlarged head end 48.

A second joint member 50 has a fork shaped end 52 and a base end 54. The fork shaped end 52 is adapted to receive the enlarged head end 48 of the second shaft 44 between the tines 56 forming the fork shaped end 52.

Means are provided for releasably connecting, in a selectively positionable and adjustable manner, the fork shaped end 52 of the second joint member 50 to the enlarged head end 48 of the second shaft or bolt 44. As with the assembly connected to the first mounting plate 12, the second shaft or bolt 44 is provided with an enlarged head end 48. A fork shaped end 52 of the second joint member 50 and the enlarged head end 48 each has an opening or passageway 58 and 60, respectively, aligned to receive a threaded bolt 62 therethrough. A portion 64 of the passageway 60 is threaded to mate with the threaded bolt 62 to retain the enlarged head end 48 in the fork shaped end 52 in a releasable, selectively positionable, compressive relationship as the threaded bolt 62 is advanced into the threaded portion 64.

Means are also provided for releasably connecting the base ends 28 and 54 of the first and second joint members 24 and 50, respectively, in a rotationally and axially adjustable manner.

In the preferred embodiment, such means comprise a first and a second recess 66, 68 in the base ends 28, 54 of the first and second joint members 24 and 50, respectively. The first and second recesses 66, 68 are each adapted to releasably receive therein a portion 70, 72 of a connecting rod 74 disposed between the base ends 28, 54 of the first and second joint members 24, 50 respectively.

Means are also provided for retaining those portions 70, 72 of the connecting rod 74 received in the first and second recesses 66, 68 in the base ends 28, 54 in a selective releasable relationship, comprising threaded holes 76, 78 in both the first and second joint members 24, 50 proximate the base ends 28, 54 of each of the first and second joint members 24, 50. These threaded holes 76, 78 are adapted to receive therethrough threaded bolts or set screws 80, 82 having one end 84, 86, respectively, that engages the portions 70, 72 of the connecting rod 74 received in the first and second recesses 66, 68. As the set screws 80, 82 are advanced in the threaded holes 76, 78, the portions 70, 72 are firmly locked in place by the increased frictional contact between the rod and the opposite wall, as well as the direct contact of the set screw and the rod portion.

A preferred embodiment of the present invention also includes means for releasably retaining the enlarged head ends 20, 48 of the first and second shafts or bolts 16, 44 in the fork shaped ends 26, 52 of the first and second joint members 24, 50 in a selected position.

These means comprise threaded holes 88, 90 in the first and second joint members 24, 50 proximate the fork shaped ends 26, 52 and radially diplaced form the bolts 36, 62 which form a pivot axis. Threaded holes 88, 90 are fitted with set screws 92 each having an end 94 that engages the enlarged head ends 20, 48 of the first and second bolts 16, 44. As the set screws 92 are advanced in the threaded holes 88, 90, the head ends 20, 48 are both advanced against the opposite wall and pinned directly by the inner end of the set screws 92.

Nounting plate fastening nuts 96 threadably engaged on the threaded shanks 18, 46 of the first and second bolts 16, 44 and are adapted to be threadably moved on the threaded shanks 18, 46 of the first and second bolts 16, 44 to releasably restrain rotational and axial movement of the first and second mounting plates 12, 40 with respect to the threaded shanks 18, 46 of the first and second bolts 16, 44.

Each mounting plate 12, 40 may have a plurality of holes therethrough for mounting a device such as a mobile telephone, or radio thereto. Finally, such holes in the mounting plates may be used for fastening the device 10 to a desired portion of a vehicle.

The longitudinal length of the device 10 may be increased by the addition of an extension rod 98 having at least a portion 100 adapted to be received in the recess 68 in the base end 54 of the second joint member 50. An extension member 102 has a first end 104 with a first recess 106 therein and an opposite second end 108 with a second recess 110 therein. First recess 106 in the first end 104 of the extension member 102 is adapted to releasably receive therein the portion 72 of the connecting rod 74. Likewise, the second recess 110 in the second end 108 of the extension member 102 is adapted to releasably receive therein a portion 112 of the extension rod 98.

Means are provided for retaining the portion 72 of the connecting rod 74 received in the first recess 106 in the first end 104 of the extension member 102 in a selective releasable compressive relationship.

Likewise, similar means are provided for retaining the portion 112 of the extension rod 98 received in the second recess 110 in the second end 108 of the extension member 102 in a selective releasable compressive relationship.

Both of these means preferably include threaded holes 114 in the extension member 102 proximate the ends 104, 108 of the extension member 102. Each of the holes 114 is adapted to receive therethrough a set screw 116 having one end 118 that engages the portions 110, 112 of the connecting rod 74 and extension rod 98 received in the first recess 106 in the first end 104 of the extension member and in the second recess 110 of the extension member 102, respectively, in a compressive relationship as each of the set screws 116 is advanced in the threaded holes 114 proximate the ends 104, 108 of the extension member 102.

The mounting device 10 is used by first choosing a mounting surface that is best suited to provide the user easy access to the accessory that is to be mounted. As shown in FIG. 2, full advantage may be taken of the universally adjustable nature of the mounting device 10 in choosing the mounting surface.

Next, the mounting device 10 is attached to the mounting surface by screws, or nut and bolt combinations in the conventional manner. Likewise, the accessory that is to be mounted is attached to the opposite base plate by screws or nut and bolt combinations in the conventional manner.

The movement joints of the device 10 are now positioned into the optimum postions desired for the best access to the mounted accessory and the threaded bolts 36, 80, 82, 62 and 96 are advanced to initially lock the device 10 into the selected position. Now, to provide the final locking action, screws 92 are advanced until their ends 94 engage the flattened slides of enlarged head ends 16 and 44. It is this final locking action of the present invention that provides the solution to the problem of the prior art devices discussed above. Specifically, many currently known mounting devices rely on frictionally compressive locking means to hold the mounted accessory in place. These devices are generally prone to slippage caused by vibrational or shock-induced forces acting on the mounting device and the weight of the accessory itself. These prior art devices generally result in eventual slippage and failure of the locking means of the device due to the fact that the locking means usually comprises a single shaft that provided both an axis of movement for the mounted accessory and a means to hold the movement joint in a compressive, frictional relation. With this mechanical arrangement, all of the vibrational and shock-induced forces are directly transmitted to this single shaft which, as time passes, is loosened causing the mounted accessory to shift from its originally selected, and locked, position.

The present invention, however, provides additional locking means that are radially off-centered from that of the primary shaft of the prior art devices. Being off-centered from the primary shaft of a movement joint, the additional locking means of the present invention resists any such vibrational or shock-induced loosening of the mounting device and, therefore, provides a superior mounting platform that is stable and yet capable of simple and easy adjustment when so desired by the user.

FIG. 2 shows one of the many ways how the device 10 can be used in mounting a mobile telephone in a vehicle and how the device 10 is universally adjustable for installing in various shaped spaces.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

What is claimed is:

1. An adjustable bracket for mounting a body at a selected position relative to a surface, comprising the subcombination of:

a shaft having an enlarged head end with flattened sides and a hole extending transversely therethrough at about its center and substantially perpendicular to said sides;

a joint member having a fork-shaped end with a pair of tines for receiving said flattened sides of said head end of said shaft therebetween, said tines each having a hole extending transversely therethrough and alignable with said hole in said head end, one of said tines having a threaded aperture extending transversely therethrough parallel to and spaced longitudinally apart from said aligned holes;

bolt means extending transversely through said aligned holes in said tines and said head end of said shaft for frictionally and compressively retaining said shaft in a selectable pivotal position relative to said joint member; and a set screw extending through said aperture and having an end in compressive and frictional engagement with said head end of said shaft for locking said shaft in said pivotal position against shock and vibration.

2. The bracket of claim 1, wherein said bolt means further comprise:

one of said aligned holes in said tines being threaded; and a bolt extending through said aligned holes and having a threaded end engaged in said threaded hole in said tine.

3. In an adjustable mounting bracket of the type which includes a plate adapted to be removably attached to a body that is to be positioned at a selected position relative to a supporting base, a shaft having a threaded shank portion engaged in a threaded opening extending perpendicularly through the plate, and means for locking the plate on the shaft, comprising the subcombination of:

said shaft having an enlarged head end with flattened sides opposite said shank portion;

a joint member having a fork-shaped end and a base end opposite thereof, said fork-shaped end having a pair of tines receiving said flattened sides of said head end of said shaft therebetween and a first threaded hole extending transversely through one of said tines, said base end having a cylindrical counterbore extending axially thereinto and a second threaded hole extending transversely therethrough into said counterbore;

bolt means extending transversely through said tines and said enlarged head end of said shaft, and spaced longitudinally apart from said first threaded hole, for frictionally and compressively retaining said shaft in a selected pivotal position relative to said joint member;

a first set screw extending through said first threaded hole and having an end in compressive and frictional engagement with said head end of said shaft for locking said shaft in said selected pivotal position against shock and vibration;

a connecting rod having a first end adapted for attachment to said surface and a second end received in said counterbore for positioning said member in a rotationally and axially adjustable position thereon; and a second set screw extending through said second threaded hole and having an end in compressive and frictional engagement with said rod for retaining said member on said rod in said position.

4. The bracket of claim 3, wherein said bolt means further comprise:

said head end of saidi shaft and said tines each having a transverse hole extending therethrough, one of said holes in said tines being threaded; and a bolt extending through said holes and having a threaded end engaged in said threaded hole in said tine.

5. The bracket of claim 3, further including:

a lock nut on said threaded shank of said shaft between said plate and said head end.

6. A universally adjustable mounting service for supporting a body at a selected position and aspect relative to a supporting base, comprising:

a first mounting plate adapted for removable attachment to the supporting base, and having a threaded opening extending perpendicularly therein;

a first shaft having a threaded shank threadably received in said threaded opening in said first mounting plate and having a head end with flattened opposite sides, said head end of said first shaft having a passageway extending between said flattened sides thereof;

a first threaded lock nut on said threaded shank securing the position of said first shaft relative to said first mounting plate;

a first elongated joint member having a base end and a fork-shaped end opposite said base end, said fork-shaped end receiving said flattened sides of said head end of said first shaft, said fork-shaped end having tines with aligned openings therethrough, the aligned opening in one of said tines being unthreaded and the aligned opening in the other of said tines being threaded;

first bolt means passing transversely through said unthreaded opening in said one tine of said first joint member, through said passageway in said head end of said first shaft, and into said threaded opening in said other tine of said first joint member, for compressively and frictionally retaining said first joint member in a selected pivotal position relative to said first shaft;

said first joint member having a first threaded hole formed in a tine thereof;

means for locking said first joint member in its selected pivotal position relative to said first shaft, comprising a first set screw extending through said first threaded hole and having one end engaging one flattened side of said head end of said first shaft in a compressively and frictionally retaining relationship, said first threaded hole being spaced inwardly from said aligned openings of said fork-shaped end such that the axis of said first threaded hole and said first set screw is offset along the length of said first shaft from the axis of said first bolt means;

a second mounting plate for attachment to the body, said second mounting plate having a threaded opening extending perpendicularly therein;

a second shaft having a threaded shank threadably received in said threaded opening in said second mounting plate and having a head end with flattened opposite sides, said head end of said second shaft having a passageway extending between said flattened sides thereof;

a second threaded lock nut on said threaded shank of said second shaft for securing the position of said second shaft relative to said second mounting plate;

a second elongated joint member having a base end and a fork-shaped end opposite said base end, said fork-shaped end receiving said flattened sides of said head end of said second shaft, said fork-shaped end having tines with aligned openings therethrough, the aligned opening in one of said tines being unthreaded and the aligned opening in the other of said tines being threaded;

second bolt means passing transversely through said unthreaded opening in said one tine of said second joint member, through said passageway in said head end of said second shaft, and into said threaded opening in said other tine of said second joint member, for compressively and frictionally retaining said second joint member in a selected pivotal position relative to said second shaft;

said second joint member having a second threaded hole formed in a tine thereof;

means for locking said second joint member in its selected pivotal position relative to said second shaft, comprising a second set screw extending through said second threaded hole and having one end engaging one flattened side of said head end of said second shaft in a compressively and frictionally retaining relationship, said second threaded hole in said second joint member being spaced inwardly from said aligned openings of said fork-shaped end of said second joint member such that the axis of said second threaded hole and said second set screw is offset along the length of said second shaft from the axis of said second bolt means;

each of said joint members having a cylindrical opening in its base end; and means for releasably interconnecting said base ends of said first and second joint members in a rotationally and axially adjustable manner, said interconnecting means including (a) a connecting rod having cylindrical ends which are slidably and rotatably received within corresponding ones of said cylindrical openings, (b) each joint member having an additional threaded hole extending through the wall thereof and into said cylindrical opening thereof, and (c) a separate set screw received in each of said additional threaded holes for independently retaining the corresponding joint member in its position of attachment to said connecting rod, so that the body is firmly supported and retains its selected position and aspect when subjected to shocks and vibration.

7. The universal mounting device of claim 6 wherein the flattened head ends of said first and second shafts are enlarged relative to the threaded shank ends thereof.

8. The universal mounting device of claim 6 wherein said first threaded hole in each of said joint members is formed in said other tine thereof, spaced inwardly from the threaded one of said aligned openings.

* * * * *